United States Patent [19]

Barnhart

[11] Patent Number: 4,492,054
[45] Date of Patent: Jan. 8, 1985

[54] FISH LURE

[76] Inventor: Gerald K. Barnhart, c/o 3252 Shelley St., Victoria, B.C., Canada, V8P 4A5

[21] Appl. No.: 413,881

[22] Filed: Sep. 1, 1982

Related U.S. Application Data

[63] Continuation-in-part of Ser. No. 319,906, Nov. 10, 1981.

[30] Foreign Application Priority Data

Jul. 30, 1981 [CA] Canada ............................... 382884

[51] Int. Cl.³ ............................................. A01K 85/00
[52] U.S. Cl. ............................ 43/42.23; 43/42.22; 43/42.36; 43/42.35; 43/42.34
[58] Field of Search ................ 43/42.09, 42.22, 42.23, 43/42.34, 42.35, 42.36, 42.39, 42.45, 42.47, 42.49

[56] References Cited

U.S. PATENT DOCUMENTS

| D. 218,932 | 10/1970 | Perrin | 43/42.47 |
|---|---|---|---|
| 1,582,713 | 4/1926 | Welch | 43/42.47 |
| 2,780,884 | 2/1957 | Hadfield | 43/42.49 |
| 3,205,608 | 9/1965 | Dickinson | 43/42.23 |
| 3,392,474 | 7/1968 | DeWeese | 43/42.09 |
| 3,685,192 | 8/1972 | Stibbard | 43/42.35 |
| 4,134,224 | 1/1979 | Clark | 43/42.36 |
| 4,337,591 | 7/1982 | Gell et al. | 43/42.09 |

Primary Examiner—Nicholas P. Godici
Assistant Examiner—Kurt Rowan
Attorney, Agent, or Firm—Birch, Stewart, Kolasch & Birch

[57] ABSTRACT

A novel fish lure is provided herein. The lure is shaped in the form of a minnow having a main body of generally hydrodynamic shape including a head portion, with a nose projecting from the forward end thereof and a tail tip portion. The nose projecting from the head is provided with a plurality of holes (e.g., three or four) in the front portion thereof, through which a fish line is adapted to be threaded. The holes are situated along the symmetric longitudinal axis of the nose, from the top face thereof to the bottom face thereof. One hole imparts the most erratic action. A second hole imparts lessened erratic action, and the third hole imparts extremely vibrant but tight movement from the center. In all cases, the action of the plug is side-to-side at the same time as the plug oscillates on its longitudinal axis. The fish lure is one to which can be imparted erratic action in which the action is a simultaneous side-to-side and oscillation on its longitudinal axis. The lure may be patterned to represent a minnow more closely.

10 Claims, 16 Drawing Figures

FISH LURE

BACKGROUND OF THE INVENTION (i) Related Application

This invention is a continuation-in-part of pending application Ser. No. 319,906 filed Nov. 10, 1981.

(ii) Field of the Invention

This invention relates to fish lures.

(iii) Description of the Prior Art

The art is replete with artificial fish bait developed for one purpose or another. Canadian Pat. No. 436,322 dated Aug. 13, 1946 in the name of D. Rosegard attempted to provide improvements in the manner and means of applying the hooks to the plug so as to prevent their fouling one another. This was said to be provided by a fish lure in which the plug body as formed with channels leading from the forward end portion of the body and opening, in spaced relationship, to the underside thereof, with a cord having a loop and two end portions freely passing through the channels to the underside of the plug body, with fish hooks attached to the cord ends, and a fish line slidably connected with the loop.

Canadian Pat. No. 481,461 issued Mar. 4, 1952 to W. Jordan proposed to provide a fish lure and hook assembly wherein the strain upon the hook was evenly distributed through the hook-strand instead of occurring directly on to the lure. This was said to be achieved by a fish lure and hook assembly including an open-ended passageway extending through the lure, a hook strand extending through the passageway, a hook secured to the strand also being secured near the head end opening of the paageway, a swivelling-eye accessory freely slidably on the strand, and a friction stop in the form of an apertured bead.

Canadian Pat. No. 531,671 issued Oct. 16,1956 to G. P. Heiner proposed to provide a fishing lure for trout, bass or other game fish so designed that it will ride properly in the water and will have the correct amount of action to attract the fish and which has a structure to cause greater wobble in the action of the lure. This was said to be achieved in a fishing lure comprising a solid body having greater length than width and having a particularly recited triangular shape having a curved bottom, a downwardly extending tail with openings in the sides thereof, a double shanked hook pivoted in the openings and attaching means at a particularly recited location adapted for connection to a fish line or fishing hook.

Canadian Pat. No. 537,831 issued Mar. 5, 1957 to J. S. Allman et al proposed to provide an artificial fishing lure which was to be a close representation of a real live bait, a herring for example. This was said to be provided by producing a filler core from deformable interconnected laminations and completely enveloping the filler core within an outside wrapper, which is natural scale-equipped fish and which is cut from real fish skin.

Canadian Pat. No. 562,247 issued Aug. 26, 1958 to G. C. Wentwood proposed to provide a fish lure which would, by the relative motion of its parts and its movement in the water, closely simulate the action of the natural prey of fish and wherein the motion of the lure in the water and the character of its motion as well as the relative motion of the parts of the lure could be easily controlled by the angler. This was said to be achieved in a fishing lure comprising a body having longitudinally and horizontally disposed front, middle and tail sections, means disposed between and pivotally connecting the sections at their lower portions for vertically swinging movement, a hook carried beneath and by at least one of the sections, and a line operatively connected to and spaced from at least two of the sections at the bottom portions thereof and spaced laterally from the pivotal connections of the sections.

Canadian Pat. No. 644,777 issued July 7, 962 to J. R. Zemen proposed to provide a trigger mechanism for fish lures whereby, upon engagement from a fish, a retracted hook would be released for swift advance to an open position wherein the hook would operate most effectively to catch the fish. This was said to be provided by a fish lure having an elongated based with line-attaching means near its forward end, a shank having one end in pivotal connection with the base and formed at its opposite end with a hook having reversely facing point, a particular trigger mechanism for the shank, and a spring-engaging catch anchored to the base.

Canadian pat. No. 670,046 issued Sep. 10, 1963 to D. R. Greer proposed to provide an artificial fish lure bearing a novel and realistic overlapping scale simulation of natural size, the objects, advantages and distinguishing features. This is said to be provided by a fish lure provided with a plurality of scale elements including transverse leaves mounted substantially perpendicular to a longitudinal mounting element by means providing a hole in the transverse leaves, each of the transverse leaves having a portion bent rearwardly to create an overlapping relation with an adjacent leaf and contoured to provide a transverse plurality of simulated individual scales and means for spacing and confining the transverse leaves.

Canadian Pat. No. 786,533 issued June 4, 1968 to R. O. Blanks proposed to provide a hollow minnow lure which could work on top water and under water, and which would simulate the action of a lazy minnow, a wounded minnow and will also work from the top water down two feet under and may serve as a floater or a popper. This was said to be provided in a minnow lure, whose body was forwardly tapered and rearwardly tapered, a nose, a tail, a longitudinally extending opening, wires associated with the body, and a guide lip angularly secured to a forward portion of the body.

Canadian Pat. No. 853,419 issued Oct. 13,1970 to L. R. Bellah et al proposed to provide a buoyant traveling device useful as a bobber or as a lure. This was said to be provided by a buoyant traveling device having a pair of line attachment portions, an upwardly facing planing surface when resting on the water and a weight directly beneath the line attachment portion.

Canadian Pat. No. 950,671 issued July 9, 1974 to C. P. Metzger proposed to provide a lure having the general appearance of a herring strip but which did not require the use of fresh bait to attract fish. This was said to be provided in a lure which was shaped to roll as it is trolled through the water and to move otherwise about in a manner most likely to attract the attention of the salmon or other game fish and to deceive the fish into thinking it is a live but injured herring darting about in the frantic effort to escape. The rate at which the lure rolls or rotates during trolling can be adjusted by altering the position of the leader where it extends forwardly of the lure and relative to adjacent parts of the head of the lure.

U.S. Pat. No. 1,490,101 issued Apr. 15, 1924 to R. F. Dichman proposed to provide an artificial fish bait equipped with a plurality of hooks extending in various directions from different sides, all connected by a single wire, the wire constituting attaching means for the line, and constructed with a spoon head so located as to cause the bait to twirl or zig-zag through the water. The body member had an upstanding head and a downturned tail. The head had a spoon-shaped recess on its lower face and lines secured to the base of the lower face of the head and to the extreme front end thereof with the bait having hooks carried thereby.

U.S. Pat. No. 1,499,975 patented July 1, 1924 by J. E. Ford proposed to provide an artificial fish bait, having a pair of holes therethrough so that when fishing in still water the fishing line is passed through the other hole, thereby controlling the action of such bait to have it imitate a live minnow in both characters of water. The artificial bait of buoyant material had a weight in its bottom intermediate the ends thereof, with flexible fins and tail pieces carried by the body.

U.S. Pat. No. 1,777,004 patented Sep. 30, 1930 by L. S. Lemere et al proposed to provide a fishing bait or lure of flexible construction, made to simulate a living organism and capable of being bent into different positions and of retaining the positions to which it is bent, thereby to secured different movements in the water. The fish lure was a relatively flat body member of flexible material, with a flexible non-resilient material strip embedded in, and extending lengthwise of the body member, hooks secured to the lines through the body member.

U.S. Pat. No. 1,840,273 patented Jan. 5, 1932 by J. S. Lang proposed to provide a class of lures which when drawn through the water have an oscillatory, rolling or diving motion or a combination of these motions imparted to them by the action of the water upon them. This was said to be provided by a traction member extending beneath the body of the lure, and light reflectors borne by the traction member.

U.S. Pat. No. Re. 18390 reissued Mar. 22, 1932 by J. T. Welch proposed to provide an artificial minnow with certain improvements by which a more attractive and serviceable surface finish is produced at a considerable saving in labor and expense. This was said to be provided by a fish bait having a body of transparent material with surface decoration formed in part by the material of the body.

U.S. Pat. No. 1,851,823 patented Oct. 11, 1932 by A. V. McKenzie proposed to provide a metal bait which would float and which had a surface finished to cause the bait to be highly attractive. This was said to be provided by an artificial bait comprising a hollow elongated metal body formed in halves, the body having two coatings, the inner coating having a silvery appearance, and the outer coating having an iridescent appearance.

U.S. Pat. No. 2,110,382 patented Mar. 8, 1938 by J. H. Martin proposed to provide a flexible securing means for attaching a hook or plurality of hooks to a fish lure. This was said to be provided by a fish lure provided with a draft link and having a line attached at one end to the link and a hook attached to the free end of the line, and a supporting eye secured to the lure for suspending the free portion of the line.

U.S. Pat. No. 2,256,173 patented Sep. 16, 1941 by O. Schechterle proposed to provide means for attaching hooks to artificial minnow plugs. This was said to be achieved by a screw eye, a socket member, a boss releasably engaged in the socket member and including a line guiding eye, and a trolling line attached to the screw eye.

U.S. Pat. No. 2,283,960 patented May 26, 1942 by W. J. Wade proposed to provide a trolling plug that would have a combined darting and wobbling or oscillating movement when it was drawn through the water to simulate the movement of a stunned or wounded fish. This was said to be achieved by a body member of special circular cross-sectional shape and a rigid plate of special shape and position.

U.S. Pat. No. 2,389,883 patented Nov. 27, 1945 by R. B. Worden proposed to provide a fish lure of a type wherein the line and shaft of a hook may be concealed within the body of the lure but which was readily releasable as a result of a strike. This was said to be provided by a body provided with a reeveway for the line, the body in its under portion being provided with a cavity with which the reeveway communicates and with a slot extending lengthwise of the body and in communication with the cavity, receiving the shank of the hook so that the shank is hidden within the body.

U.S. Pat. No. 2,545,185 patented Mar. 13, 1951 by C. A. Winslow proposed to provide a trolling gear which included a parafish having means for adjusting its depth when in use and additional means for regulating the direction of travel. This was said to be provided in a trolling device including a thin, flat body member, pivotally arranged laterally projecting fin members, fastening means, a tow line, a bridle for connecting the tow line to the body member, flexible straps, and clamping means for the straps. U.S. Pat. No. 2,572,616 patented Oct. 23, 1951 by W. A. Hensen proposed to provide a fish lure in which hooks are suspended from the lure by the fishing line. This was said to be provided by a buoyant body having a pair of openings and a spring clip positioned on the upper surface of the body and spaced rearwardly from the opening through the forward end of the body, and fishing line having fish hooks thereon positioned between the opening through the rear portion of the body and opening through the forward end of the body.

U.S. Pat. No. 2,595,191 patented Apr. 29, 1952 by C. E. Erickson proposed to provide an artificial lure which obtains its attracting action in the water without the necessity of resorting to an unnatural bait fish form. Theis was said to be obtained by a simulated bait fish having two transverse bores through its sides at locations spaced apart lengthwise thereof, a rigging line passed continuously through the bores, and separate hooks slidably secured to the rigging line at the respective ends of the straight bore.

U.S. Pat. No. 2,994,982 patented Aug. 8, 1961 by S. A. Murawski proposed to provide an artificial fishing lure which is so constructed as to attract fish thereto due to the fact that the lure will have every appearance of a live minnow or the like and in which the hook is concealed from fish approaching the lure. This was said to be achieved in a hollow body member of soft pliable plastic material, fins of thin flexible structure, a head member and a tail member, a downwardly and rearwardly inclined channel, a hook member disposed within the channel, an abutment in the base of the channel, the hook being releasable upon compressive force upon the tail member of the lure.

U.S. Pat. No. 3,218,750 patented Nov. 23, 1965 by Irving I. Levin proposed to provide a fishing lure resembling a fish, and having the physical connection between the body of the fish and tail piece so formed that such body connection and the tail piece will constitute an elastic system which will create a restoring force to operate upon the mass of the tail piece to establish the basic combination of a spring and mass of a vibrating system. This was said to be provided by a body formed of soft rubber-like material so resemble an actual small fish of minnow size, having fins, an oscillatable tail, a resilient curved bib, and the bib was freely flexible with respect to the tail in response to reaction pressure from water through which the lure is being drawn.

U.S. Pat. No. 3,370,375 patented Feb. 27, 1968 by G. J. Offeonello proposed to provide a fish lure which will travel when pulled through the water in a relatively buoyant mode and will maintain an axis with the bottom surface pointing downwardly and the top surface pointing upwardly high resistance towards rotation. This was said to be provided in a fishing lure having a weighted elongated body, means mounted on the front end of the lure for attaching a fish lure, attaching means at the rear, longitudinally disposed guides in each face, a centrally disposed raised projection mounted on the rear end of the lure, and a water-flow protuberance across the frontal end of the channel.

U.S. Pat. No. 3,392,474 patented July 16, 1968 to R. M. Weese proposed to provide a multipurpose lure. This was said to be provided by a body to which a cover jacket of springy material having a desired color surface design or artwork was attached. The cover jacket could be removed to allow substitution of a different cover jacket.

U.S. Pat. No. 3,393,466 patented July 23, 1968 by H. A. Le Master proposed to provide a plastic molded fishing lure having predetermined buoyancy characteristics. This was said to be provided by a hollow fishing lure having a cavity therein to provide a predetermined buoyancy in water. A semi-cylindrical weight is adjustably retained in the body to adjust the attitude and buoyancy in water from fresh to various degrees of salt density.

U.S. Pat. No. 3,494,065 patented Feb. 10, 1970 proposed to provide a fishing lure in which areas of flashing reflected light is created which have real or apparent movement on a uniformly colored background as the lure moves through the water. This was said to be achieved in a fishing lure having the form of a small fish, the skin of which is of a uniform reflective color and which comprises a specified transparent synthetic resin material layer. By the specific structure, a traveling visual pattern of contiguous hexagons with bright centers is presented while the lure is moved.

U.S. Pat. No. 3,956,847 patented May 18, 1976 by J. W. Bayes proposed to provide a deep line weight which is in the shape of a fish so that as it descends downwardly through a school of fish, the weight simulating another school of fish causes some of the school of fish to turn and follow it and grab lures that are adjacent thereto on the commercial setup. This was said to be provided by a weight that is cast into the shape of a fish, the weight being secured to fish lines by special means.

SUMMARY OF THE INVENTION (i) Aims of the Invention

In spite of all these patents, there is still a need for, and it is main object of the present invention to provide, a fish lure to which can be imparted erratic action in which the action is a simultaneous side-to-side and oscillation on its longitudinal axis.

The above-identified patent application provided a significant improvement over fish lures previously proposed. However, it is now a further object of this invention to provide a further improvement in the fish lure to which even more erratic action can be imparted, in which the action is an exaggerated, simultaneous side-to-side and oscillation on its longidudinal axis.

(ii) Statement of Invention

This invention now provides an improvement in a fish lure shaped in the form of a minnow in which the head thereof is provided with a plurality of holes in the front portion thereof, through which the line is adapted to be threaded, in which in one hole imparts the most erratic action, in which a second hole imparts lessened erratic action and in which a third hole imparts extremely vibrant but tight movement from the center so that the action of the plug is side-to-side at the same time as the plug oscillates on its longitudinal axis, general shape of a tail-less minnow comprising a main body of generally hydrodynamic shape including a head portion and a tail portion: the main body having, in side elevational view, a gently rounded upper back surface and an arcuately rounded belly surface and having, in top plan view, side faces which diverge from the head portion to a maximum body thickness and then converge to the tail tip portion; a projecting, flat, plate-like nose extending from the head in the form of a smooth extension of the genly rounded upper back surface and extending downwardly less than the height of the body from the upper surface to the lower surface, the nose, in longitudinal section, having a bow portion constituted by an upper surface which near the body runs parallel to the bottom surface thereof, but which, near the tip slopes downwardly to merge with the lower surface at a forward edge thereof, the nose having a shape, in top plan view, of sides which diverge from the body portion, the diverging sides running forwardly in parallel with one another and then curving towards each other to meet in a flat front edge at the bow of the nose, only the nose further being provided with a plurality of spaced apart holes therethrough disposed along the central longitudinal axis thereof for securing a fish line drawn through a selected hole or holes; a depending tail fin along the central longitudinal axis of the body, the tail fin being associated with a fish-line guiding channel extending along an arcuate path longitudinally disposed above a joint between the tail fin and the body and extending longitudinally exclusively through the body; whereby, in use, an erratic a side-to-side action is imparted to the fish lure simultaneously along with an oscillation of the lure along its longitudinal axis.

(iii) Other Features of the Invention

By one feature thereof, the lure includes a hollow core preferably provided with a predetermined amount of a buoyancy controlling ballast material therein.

By a further feature, the side faces are flattened from the top edge to the bottom edge.

By yet another feature, the flattened side faces may be patterned by affixing decals thereto.

By a further, the flattened side faces are embossed by means of hot foil stamping to create a herringbone effect on the lower portion thereof, and a fish scale pattern on the upper portion thereof.

By a still further feature, the nose includes a major upper face portion adjacent the body which is essentially parallel to the lower face thereof, the lower face dipping downwardly, and a minor upper face forwardly projecting merging with the lower face.

By a further feature, fish-line-guiding channel extends through main body, but is separated from the hollow from the hollow core by a longitudinally extending curved channel.

By still another feature, the side faces are smooth.

By a still further feature, the smooth side faces have metallic foil secured thereto.

BRIEF DESCRIPTION OF THE DRAWINGS

In the accompanying drawings.

Figure 1:
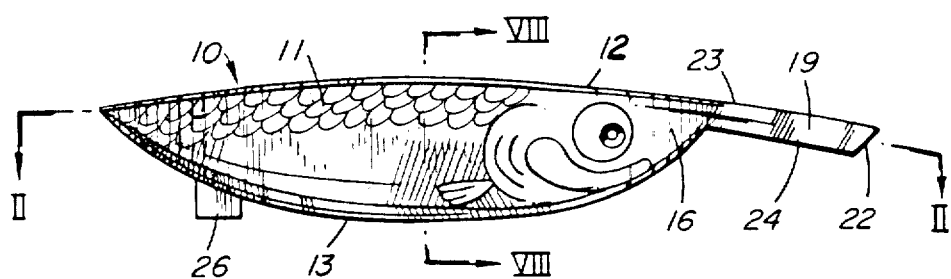
FIG. 1 is a side elevational view of the fish lure of one embodiment of this invention.
Figure 2:
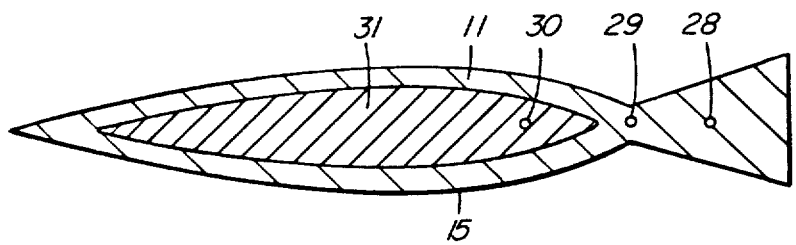
FIG. 2 is a longitudinal section along the line II—II of FIG. 1.
Figure 3:
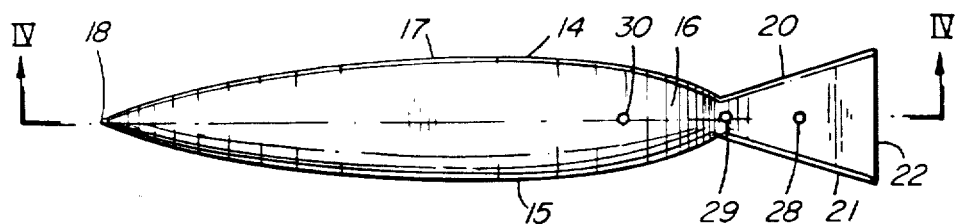
FIG. 3 is a top plan view of the embodiment of FIG. 1.
Figure 4:
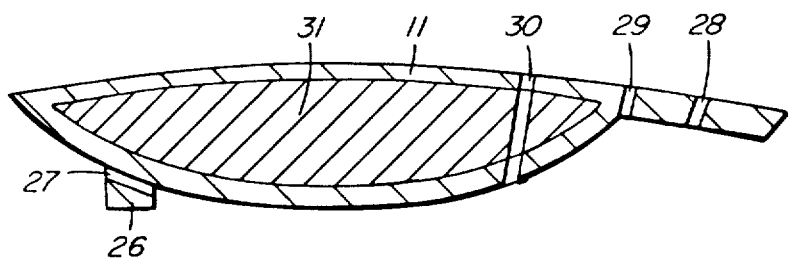
FIG. 4 is a central longitudinal section along the line IV—IV of FIG. 3.
Figure 5:
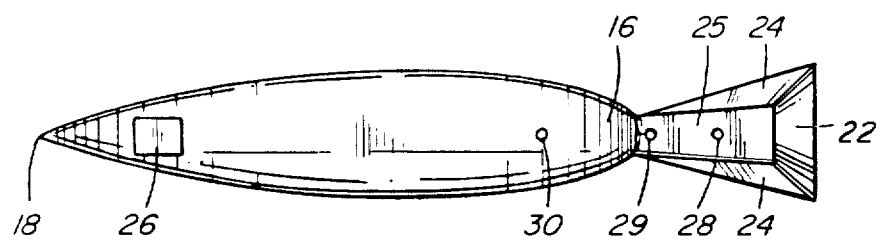
FIG. 5 is a bottom elevational view of the embodiment of FIG. 1.
Figure 6:
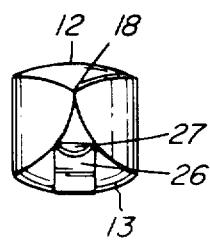
FIG. 6 is a rear elevational view of the embodiment of FIG. 1.
Figure 7:
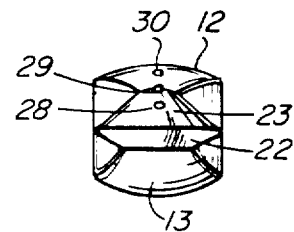
FIG. 7 is a front elevational view of the embodiment of FIG. 1.
Figure 8:
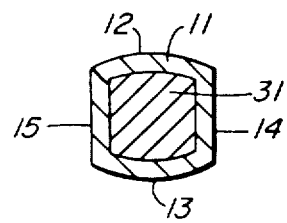
FIG. 8 is a transverse section along the line VIII—VIII of FIG. 1.

DESCRIPTION OF PREFERRED EMBODIMENT (i) Description of FIG. 1-8

As seen in the drawings, and particularly in FIGS. 1, 3, 5, 6 and 7, and fish lure 10 includes a main body portion 11 of hydrodynamic shape having a gently rounded upper back surface 12, an arcuately rounded belly surface 13 and side faces 14, 15 which diverge from the head portion 16 to a maximum thickness at 17 and then converge to a common tail tip 18.

The head portion 16 is provided with a projecting nose 19 having diverging side faces 20, 21 and erminating in a downwardly bevelled leading edge 22. The upper face 23 is flattened but extends as an extension of upper back surface 12, and the lower face 24 is also flat but is generally parallel to upper face 23 and is also provided with a central plane portion 25.

Depending from the belly surface 13 near the tail tip 18 thereof is a fin 26, provided with a longitudinally extending channel 27.

The essence of the invention is characterized by a plurality of fish line holes 28, 29 and 30. Holes 28 and 29 extend through the nose 19, while hole 30 extends through the main body 11 near the head portion 16.

Also considered to be a subsidiary characteristic of this invention is the rear line guide channel 27. The line guide channel is associated with a split ring (not shown) to allow a hook (not shown) to swing free, since the hook must not be fixed to the lure 10.

It is also desirable to have the body 11 made hollow and to have it contain a mass of buoyancy material 31 (which may be lighter or heavier than the lure 10) to control buoyancy. The side faces 14, 15 are flattened to facilitate embossing or other patterning. Preferably, the embossing is by means of hot foil embossing to impart a herrinbgone pattern to the lower portion, and a fish scale pattern to the upper portion.

The lure 10 may be made out of any suitable material, e.g., a synthetic plastic, i.e., polyethylene, polypropylene, polyvinylchloride, etc.

Figure 9:
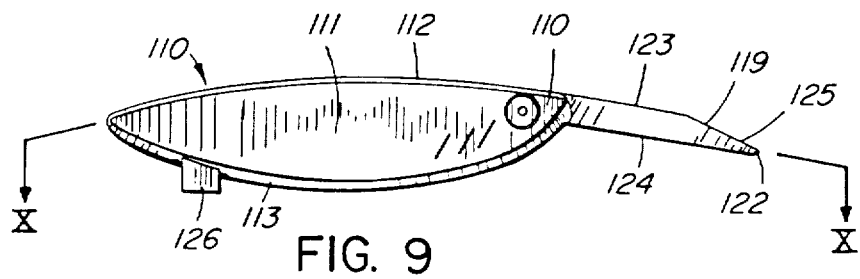
FIG. 9 is a side elevational view of the fish lure of another embodiment of this invention.
Figure 10:
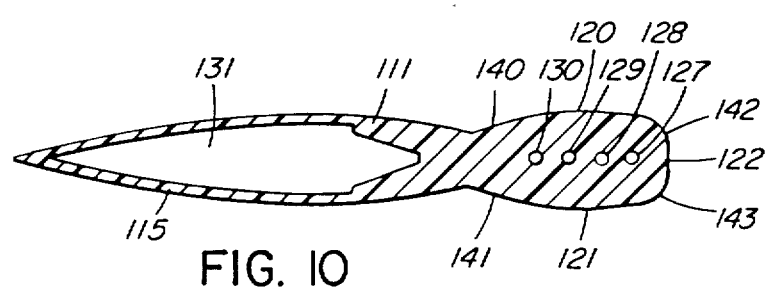
FIG. 10 is a longitudinal section along the line X—X of FIG. 1.
Figure 11:
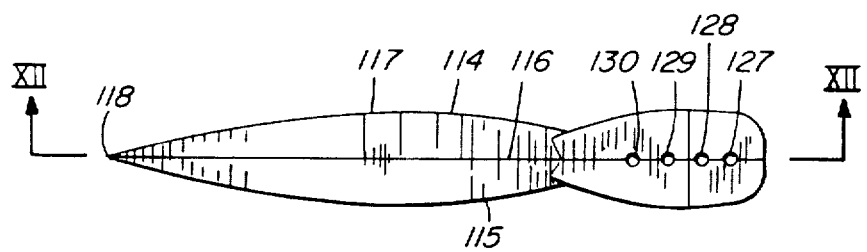
FIG. 11 is a top plan view of the embodiment of FIG. 9.
Figure 12:
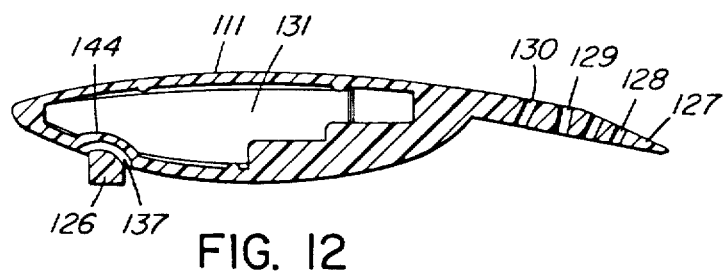
FIG. 12 is a central longitudinal section along the line XII—XII of FIG. 11.
Figure 13:
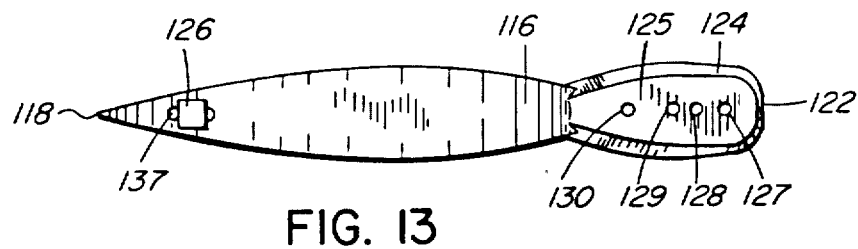
FIG. 13 is a bottom elevational view of the embodiment of FIG. 9.
Figure 14:
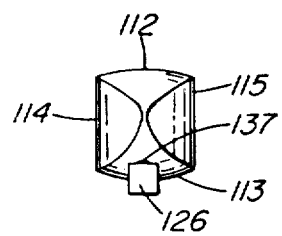
FIG. 14 is a rear elevational view of the embodiment of FIG. 9.
Figure 15:
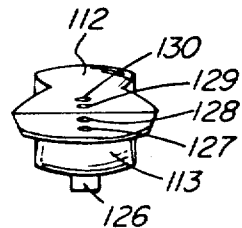
FIG. 15 is a front elevational view of the embodiment of FIG. 9.
Figure 16:
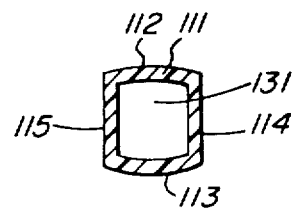
FIG. 16 is a transverse section along the line XIII—XIII of FIG. 9.

(ii) Description of FIGS. 9-16

As seen in the drawings, and particularly in FIGS. 9, 11, 13, 14 and 15, the fish lure 110 includes a main body portion 111 of hydrodynamic shape having a gently rounded upper back surface 112, an arcuately rounded belly surface 113 and side faces 114, 115 which diverge from the head portion 116 to a maximum thickness at 117 and then converge to to a common tail tip 118.

The head portion 116 is provided with a projecting nose 119 having side faces 120, 121 which diverge from the main body portion 116 at 140, 141 and which terminate in a leading edge 122 which merges with side faces 120, 121 by rounded corners 142, 143. The upper face 123 is flattened by and extends as a butted extension of upper back surface 112. The lower face 124 is also flat but is generally parallel to upper face 123. The upper face 123 includes a forward downwardly bevelled portion 125, which meets leading edge 122.

Depending from the belly surface 113 near the tail tip 118 thereof is a fin 126, provided with a longitudinally extending curved channel 137 separated from the hollow interior 131 of the line 110 by an upper curved wall 144. The rear guide channel 137 may be associated with a split ring (not shown) to allow a hook (not shown) to swing free, since the hook must not be fixed to the lure 110.

The essence of the invention is characterized by a plurality of fish line holes 127, 128, 219 and 130, each of which extend through the nose 119.

The body 111 is made hollow to provide a buoyancy chamber 131. The side faces 114, 115 are flattened to facilitate securing of metal foil thereto for decorative purposes. Preferably, the securing of the foil is by means of hot foil securement.

OPERATION OF THE PREFERRED EMBODIMENT (i) Operation of Embodiment of FIGS. 1-8

In use, fish line is threaded through one or more of holes 28, 29 and 30, and then guided along guide channel 27. When threaded through hole 28, a most erratic action is imparted to the lure. When threaded through hole 29, a lessened erratic action is imparted. When threaded through hole 30, an extremely vibrant but tight movement from the center is provided. In all cases, however, the basic action of the plug is from side-to-side while at the same time providing oscillation of the plug along its longitudinal axis.

(ii) Operation of Embodiment of FIGS. 9-16

In use, fish line is threaded through one or more of holes 127, 128, 129 and 130, and then guided along guide channel 137. When threaded through hole 127, a most erratic action is imparted to the lure. When threaded through hole 128, a lessened erratic action is imparted. When threaded through hole 129, a still lessened erratic action is imparted. When threaded through hole 130, extremely vibrant but tight movement from the center is provided. In all cases, however, the basic action of the lure is from side-to-side while at the same time providing oscillation of the lure along its longitudinal axis.

SUMMARY

From the foregoing description, one skilled in the art can easily ascertain the essential characteristics of this invention, and without departing from the spirit and scope thereof, can make various changes and modification of the invention to adapt to various usages and conditions. Consequently, such changes and modifications are properly, equitably and "intended" to be within the full range of equivalence of the following claims.

I claim:

1. A fish lure in the general shape of a tail-less minnow comprising a main body of generally hydrodynamic shape including a head portion and a tail tip portions; said main body having, in side elevational view, a gently rounded upper back surface and an arcuately rounded belly surface and having, in top plan view, side faces which diverge from the head portion to a maximum body thickness and then converge to the tail tip portion; a projecting, flat, plate-like nose extending from the head in the form of a smooth extension of the gently rounded upper back surface and extending downwardly less than the height of the body from the upper surface to the lower surface, the nose, in longitudinal section, having a bow portion constituted by an upper surface which near the body runs parallel to the bottom surface thereof, but which, near the tip slopes downwardly to merge with the lower surface at a forward edge thereof, the nose having a shape, in top plan view, of sides which diverge from the body portion, the diverging sides running forwardly in parallel with one another and then curving towards each other to meet in a flat front edge at the bow of the nose, only the nose further being provided with a plurality of spaced apart holes therethrough disposed along the central longitudinal axis thereof for securing a fish line drawn through a selected hole or holes; a depending tail fin along the central longitudinal axis of the body, said tail fin being associated with a fish-line guiding channel extending along an arcuate path longitudinally disposed above a joint between said tail fin and said body and extending longitudinally exclusively through said body; whereby, in use, an erratic a side-to-side action is imparted to said fish lure simultaneously along with an oscillation of said lure along its longitudinal axis.

2. The fish lure of claim 1 including a hollow core.

3. The fish lure of claim 1 wherein said side faces are flattened from the top edge to the bottom edge.

4. The fish lure of claim 1 wherein said side faces are patterned by affixing decals thereto.

5. The fish lure of claim 1 wherein said side faces are patterned.

6. The fish lure of claim 1 including a hollow core provided with a predetermined amount of a buoyancy-controlling ballast material therein.

7. The fish lure of claim 4 wherein said fish-line guiding channel extends through said body but is separated from said hollow core by a longitudinally extending curved channel.

8. The fish lure of claim 1 wherein said side faces are smooth.

9. The fish lure of claim 8, wherein said smooth side faces have metallic foil secured thereto.

10. The fish lure of claim 6 wherein said fish-line-guiding channel extends through said body, but is separated from said hollow core by a longiudinally extending curved channel.

* * * * *